United States Patent [19]

Dotson, Sr.

[11] 4,290,221

[45] Sep. 22, 1981

[54] MINNOW DIPPERS

[76] Inventor: Harold C. Dotson, Sr., P.O. Box 1306, Socorro, N. Mex. 87801

[21] Appl. No.: 93,540

[22] Filed: Nov. 13, 1979

[51] Int. Cl.$^3$ ............................................. A01K 97/00
[52] U.S. Cl. .......................................... 43/4; 43/55; 294/55
[58] Field of Search ............................ 43/4, 11, 12, 55; 30/141, 325; 294/55

[56] References Cited

U.S. PATENT DOCUMENTS

| | | | |
|---|---|---|---|
| 2,531,551 | 11/1950 | Brecht et al. | 43/4 |
| 2,611,982 | 9/1952 | Sears | 43/4 |
| 2,670,557 | 3/1954 | Pachner | 43/4 |
| 3,308,570 | 3/1967 | Horton | 43/4 X |
| 3,354,575 | 11/1967 | Darrow | 43/4 X |
| 3,803,743 | 4/1974 | Nalepka | 43/4 |
| 3,975,853 | 8/1976 | Aaron | 43/4 |

FOREIGN PATENT DOCUMENTS 239692  3/1911  Fed. Rep. of Germany ........ 30/141

Primary Examiner—Stephen G. Kunin
Assistant Examiner—Robert P. Olszewski
Attorney, Agent, or Firm—Cushman, Darby & Cushman

[57] ABSTRACT

A monolithic, rigid minnow dipper constructed of clear or transparent material (plastic in the preferred embodiment), including a handle and a scoop portion. The handle is hollow and conical, and serves to trap individual minnows so that they may be hooked to serve as live fishing bait. The scoop portion includes perforated sidewalls, an unperforated end wall and an unperforated lower portion which tapers toward a funneled trough-shaped handle having a cross-section shaped like a minnow. The trough opening of the handle serves to permit a hook to be inserted into the trapped minnow and, after the minnow is slipped backward a short distance, is wide enough to remove the hooked minnow there through. The handle is affixed to the scoop portion at such an angle that when held level it permits the minnow to swim headfirst into the handle. The handle has sufficient perforations to release water as it flows through the handle. In the preferred embodiment, the top contour on scoop portion is shaped on the end opposite the handle to approximate the contour of the inside of a minnow bucket.

6 Claims, 5 Drawing Figures

MINNOW DIPPERS

BACKGROUND OF INVENTION

The present invention is intended to aid fishermen in getting a live minnow onto a fishing hook with minimum difficulty, and in such respect this invention relates to the field of minnow dippers and holders. The present inventor is cognizant of the following U.S. Pat. Nos.: The Pachner, 2,670,557; the Brecht, et al, 2,531,551; the Darrow, 3,354,575; the Bobo, 3,879,879 (and those U.S. Pat. Nos. identified therein in the background of the invention); the Garrison, 3,541,722; and the McCauley, 4,118,807. These Patents do not disclose or suggest the minnow dipper of the present invention. As discussed in these various Patents, there is a need for a useful minnow dipper which can facilitate getting a live minnow onto a fishing hook from a minnow container, usually a plastic or metal minnow bucket. Bobo, U.S. Pat. No. 3,879,879 aptly discusses the disadvantages in the prior art named in that invention. Additionally, the prior art, and particularly the prior art where minnow dippers have perforated scoop portions and funnel-shaped handles serving to trap minnows, have moving parts. These moving parts can break, are more expensive to fabricate, are more difficult to use—particularly for older persons and those with impaired mobility of the hands and fingers, and are capable of getting stuck with debris inasmuch as a fisherman's fishing site is generally slimy and dirty during the course of an extended fishing session. All the prior art depicts and describes those minnow dippers with perforations at the bottom. These bottom perforations cause the scoop to lose water and the fish to flounder and flop about, making it difficult to direct the fish into the handle or trap, as the case may be, particularly in the position to easily place a hook, whether in the lips, through the muscles of the back near the dorsal fin or behind the dorsal fin through the tail (being the most common methods of hooking the minnows for live bait). Use of the hands in cold weather or in cold water is undesireable, not to mention the sanitary factor of having to use one's hands to manipulate the fish into the trap or into a proper position within the trap to properly hook the fish. None of the handle type minnow dippers are monolithic, rigid pieces with an upright longitudinal slot of sufficient width to permit both insertion of a hook into a trapped minnow and removal of the trapped minnow from the trap. Difficulties in proper entry of the minnow into the handle and proper hooking and retrieval are prominent in the present art. Further advantages of the present invention will be apparent from the description, drawings and preferred embodiment.

SUMMARY OF THE INVENTION

Although very few are actually marketed in the United States, minnow dippers are intended to provide for retrieving a live minnow from a minnow bucket, overcoming the disadvantages associated with retrieving a minnow by hand from the minnow bucket or by using currently known dipping methods. This invention is intended to be used by a fisherman as an improvement over the many minnow dippers described in the Patent Nos. hereinabove mentioned and over the prior art of retrieving minnows by hand. Accordingly, this invention takes advantage of a minnow's nature, which causes a minnow to swim with escaping water as the water is poured from the dipper through the handle, thus causing the minnow to swim through the troughed handle until it becomes trapped and held stationary by the inner walls of the troughed handle. The fishing hook is then inserted into the exposed back of the minnow, through the front part of the head by inserting the hook through the troughed top to reach the head, or through the tail by inserting the hook through the troughed top to reach the tail. A new concept embodied in the present invention allows for a durable one-piece construction with no moving parts which may be manufactured with facility at low cost production. The realm of new concepts encompassed by this invention are:

(1) The minnow dipper is constructed of a clear material, preferably plastic, to avoid disturbing the fish while scooping a minnow from the minnow bucket (giving the minnow the illusion that they can swim through the scoop, which prevents fright or panic on the part of the minnow, thus making the scooping of the minnow less difficult).

(2) The dipper holds enough water to allow the minnow to be mobile until it is trapped.

(3) The dipper top is contoured to fit against the inside curve of the minnow bucket, thus decreasing the chance that the minnow will escape the minnow dipper during the scooping operation. In the preferred embodiment of this invention, the dipper top is contoured to better accommodate the majority of the minnow containers in use.

(4) A variable-depth trough in the bottom of the dipper is aligned longitudinally with the handle to cause the minnow to align itself head first toward the handle as the handle is brought to a level position.

(5) A low point exists at the interface between the handle and the dipper so that when the minnow dipper is held level, water is in both the dipper and the handle, thus allowing the minnow to easily initiate its own entrance into the trap handle.

(6) The handle is conical with an oval cross-section that corresponds approximately with the cross-section of a minnow. This handle is affixed to the dipper at such an angle above the level as to prevent water from escaping through the dipper while the minnow dipper is level. Sidewalls of the handle extend upward past the widest part of the minnow. The narrowed top end of the handle forms the retaining part of the trap. The walls stop at a point which allows the upper portion of the minnow to protrude within the handle at a location which depends upon the size of the particular minnow. A fishing hook can be then inserted into the minnow as it is trapped in the longitudinal slot of diminishing width formed by the sidewalls of the handle. The handle has its largest end next to the dipper and the smallest end away from the dipper. Thus, the handle will accommodate most sizes of minnows normally used by fishermen.

(7) The minnow dipper uses to advantage the nature of the minnow to attempt to escape from a contained area. This nature causes the minnow to align itself head-first toward the handle in its attempt to seek the deepest water, and to attempt to escape from a contained area and thus to swim into the handle. This invention actually entices the minnow to assist in getting itself into the handle and into a trapped position.

The novel features which characterize the invention are defined by the claims. The foregoing and other objects, advantages and features of the invention will appear in the drawings and detailed descriptions in the preferred embodiment which is set forth herein to illus-

DESCRIPTION OF THE PREFERRED EMBODIMENT

Figures 1, 2:
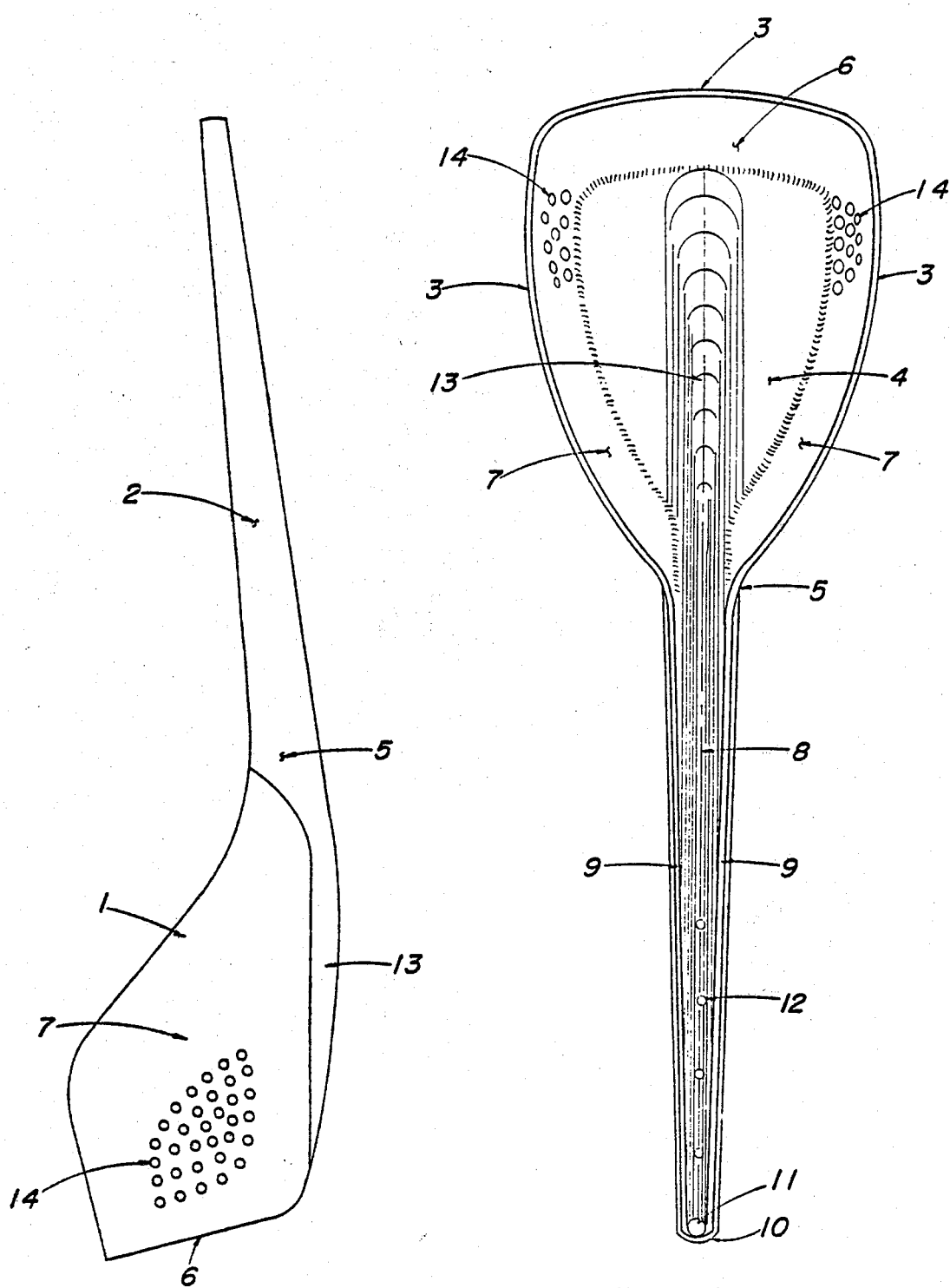
FIG. 1 is a top view of a minnow dipper constructed according to the teachings of this invention.
FIG. 2 is a side elevation view of minnow dipper of FIG. 1 with the scoop portion downward.
Figure 3:
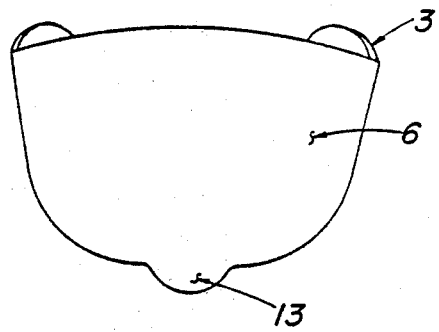
FIG. 3 is a front view of the minnow dipper of FIG. 1, viewed from the direction of the scoop.

Referring to the drawings and in particular to FIG. 2, an improved minnow dipper is illustrated. The minnow dipper has no moving parts and consists of two primary portions. One primary portion is the Dipper 1 which is used to initially scoop up the minnow from the minnow bucket or other live minnow container. The second primary portion is the troughed Handle 2 into which the minnow enters and becomes trapped. The entire minnow dipper is made of clear or transparent material, plastic in the preferred embodiment. For the purpose of description, the Dipper 1 is divided into three elements; i.e., top 3, bottom 4, and the area of interface with the handle 5. The top of the Dipper consists of the end wall 6 and the sidewalls 7 to the point of transition with the Handle 5. The sidewalls 7 transition upward from the bottom 4, in the preferred embodiment a one inch (2.56 cm.) radius curve extending upward a distance of approximately two inches (5.12 cm.) and outward at a slope of approximately ten degrees (10°) off the vertical. In the preferred embodiment other radius curves and upward slopes can be used, however, a radius curve of ¾" (1.9 cm.) to 1¼" (3.2 cm.) is the optimum radius curve for this invention, and a wall height of two inches (5.12 cm.) plus or minus ½" (1.28 cm.) is the optimum height. Likewise, other upward and outward slopes off the vertical will accomplish the intentions of this invention, however, slopes of 5° to 15° off the vertical have been found to be the optimum slope to accomplish the purposes of this invention.

The sidewalls 7 are perforated, with the lowest portion of the perforation commencing at a distance from the bottom 4 sufficient to hold enough water for the minnow to swim comfortably and to move into the direction of the Handle 2. In the preferred embodiment the perforations on either side of the sidewalls 7 commence approximately ¾ inch (1.92 cm.) from the deepest portion of the Dipper 1. There are located in the sidewalls 7 a plurality of perforations 14 of size sufficient only to pass water and debris which may be located in the live minnow container, and not so large as to allow the passage of minnows. The lower perforations are aligned approximately with an imaginary line extending on a line level to the top of the Handle 5 through the Dipper sidewalls 7.

The end wall 6 transitions from the bottom in a ⅜ inch (0.96 cm.) radius curve in the preferred embodiment to extend upward a distance of approximately 2 inches (5.12 cm.) and outward at a slope of approximately 15° off the vertical. Other radius curves and other distances are permissible within the purposes of this invention, however, ¼" (0.64 cm.) to ½" (1.28 cm.) are the optimum radius curves and 2" (5.12 cm.) plus or minus ½" (1.28 cm.) is the optimum distance for a functional minnow dipper. The sidewalls 7 then slightly curve outward toward the Handle 2, funneling to form a smooth transition into the Handle 2 at the interface 5.

In the preferred embodiment the top of the end portion of the Dipper 3, 6 and the first 1¾" (4.8 cm.) of the top of each side 3, 7 of the Dipper top is shaped to conform approximately with the inside of the usual live minnow container, which normally has vertical sides top to bottom and curved convexly side to side.

Figure 5:
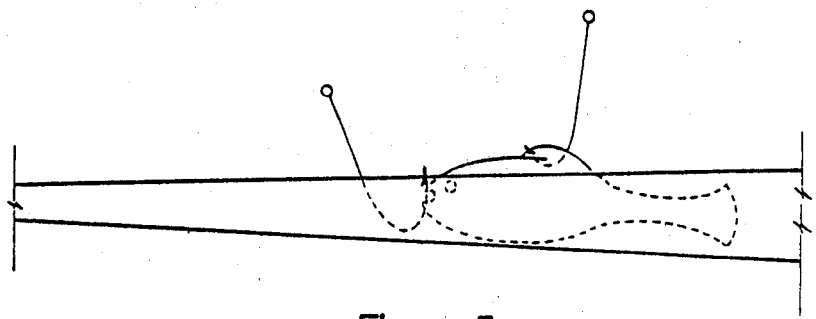
FIG. 5 is a prespective view of the handle of the minnow dipper displaying various methods of hooking the minnow trapped within the handle.

As the lowest (deepest) point of the Dipper 1 is at the interface 5, with the Handle 2, water is contained simultaneously in both the Dipper 1 and the Handle 2. This allows the minnow to either initiate its own entry into the Handle 2 or align itself head-first toward the Handle interface 5. In either case, the minnow dipper is then tilted toward the Handle 2 causing the water to flow through the Handle 2 in the manner of a sluiceway. The minnow will swim with the flowing water into the Handle 2 until it reaches its trapped position. FIG. 5.

The bottom of the Dipper 4 is saucer-shaped (slightly convex) and approximately 1¾" (4.8 cm.) wide for approximately the first 2" (5.12 cm.) from the Dipper end. This 1¾" (4.8 cm.) with additional space allowed by the curve of the transitional area between bottom 4 and sides 7 is wide enough to allow the average size minnow to reverse direction should it be necessary to align itself head-first toward the Handle 2.

A trough 13 is centered longitudinally in the bottom of the minnow dipper which is aligned with the Handle 2. The trough commences shallow near the end of the Dipper 1 and deepens toward the Handle 2 with the deepest part being at the interface 5 with the Handle 2. This configuration encourages a minnow to position itself, without manual encouragement by the user, head-first toward the Handle 2. As the Handle 2 also contains water, the minnow generally initiates its own entry into the Handle 2. If necessary, a tilt of the minnow dipper by the user toward the Handle causes the water to flow through the Handle 2 which causes the minnow to swim with the escaping water until its size matches with the decreasing width and depth of the Handle 2, at which point the minnow is held stationary and in position for inserting the hook. FIG. 5.

The Handle 2 is approximately 6¾" (17.66 cm.) long in the preferred embodiment and has the functions of both a handle to the dipper 1 and the trap and holding device for the minnow. FIG. 5. While the Handle 2 may be of various lengths, the optimum length to serve the purposes of the invention, to be of suitable size for the majority of minnows, and to be of convenient use by the average fisherman is 6½" (16.64 cm.) to 7" (17.92 cm.). The degree of taper of the Handle 2 should remain the same as in the preferred embodiment. Therefore to accommodate larger minnows, the Handle 2 should be extended in the direction of the larger end (near the interface 5), and conversely, to accommodate smaller minnows, the Handle should be extended in the direction of the smaller end 10.

Figure 4:
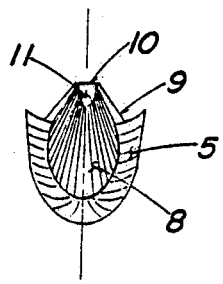
FIG. 4 is a sectional view looking from inside the scoop toward the far end of the conical handle.

The cross-section of the trough FIG. 4 is oval-shaped to conform approximately with the cross-section profile of a minnow. The size of the trough within the Handle 2 extends upward and beyond the widest part of the oval to a point so that the top portion is narrower than the widest portion FIG. 4. The top longitudinal slot of the Handle (formed by the sides 9) is of sufficient width to permit passage of a minnow, insertion of a hook into the trapped minnow and removal of the hooked minnow from the trap. This assures that the minnow is held stationary. The trough depth is designed to allow the upper portion of a minnow, regardless of the size of the minnow utilized in normal fishing, to be exposed to accommodate the placement and insertion of the fishing hook FIG. 5. To accommodate the various sizes of minnows, and to insure entrapment, the Handle trough 8 is larger at the point of interface 5 with the Dipper 1 and narrows proportionately toward the other end of the Handle 2. Thus, the minnow travels into the trough Handle 8 until the size of the minnow prevents its further movement. The Handle 2 joins the Dipper 1 at more or less a continuation of the Dipper trough, 13, and at the point where the water is deepest when the minnow dipper is held level.

To prevent the water from escaping through the handle while the unit is level the Handle 2 slopes upward at an angle of approximately 9° above the level. To accomplish the purposes of this invention, as well as for the greatest ease of use by the average fisherman, the upward angle slope of the Handle 2 optimumly should not be less than 8° nor more than 12° above the level. The outer small end of the Handle 2 in the preferred embodiment has a cross bar 10 connecting the top of the two sides of the Handle 2. No cross bar is necessary to accomplish the purposes of the invention; but the unit becomes sturdier in the preferred embodiment when such is utilized. Below the cross bar 10 is a perforation 11 of sufficient size to allow the drainage of water. The cross bar 10 and perforation 11 provide a means for attaching a string or attaching means for a float or whatever other purposes the fisherman may require such attaching means. In the preferred embodiment, several small perforations 12 are located in the bottom of the handle trough near the cross bar 10 to aid in the drainage of water. These perforations do not need to be constructed to accomplish the purposes of the invention; however, they do allow for faster drainage which allows the user to tilt the dipper faster than would otherwise be allowed.

It is therefore apparent that a minnow dipper FIG. 1 and FIG. 2 has been devised which will greatly facilitate the removal of minnows from the minnow container and will aid in the hooking of the minnow. This will have great utility among the fishermen.

It is apparent to those skilled in the art that various changes may be made in the invention without departing from the spirit and scope thereof. Therefore, this invention is not limited by details herein disclosed and this application is intended to cover such modifications as may come within the purpose of the improvements or scope of the claims.

I claim:

1. A minnow dipper of transparent material so as to avoid unduly arousing a minnow as it is being scooped-up into the minnow dipper while in a pool of water, e.g. in a minnow bucket, said dipper
    a dipper portion which is integrally formed with an elongated handle portion extending longitudinally rearwardly therefrom to a free end;
    said dipper portion including a bottom wall, two opposite upstanding sidewalls and an upstanding front wall;
    said handle portion being constituted by wall means of hollow, steeply generally conical shape, so as to be convergent away from said dipper portion, and having means defining a longitudinally extending, upwardly opening slot through said wall means, extending from said dipper portion to adjacent said free end, thereby providing an upwardly open sluiceway from said dipper portion to adjacent said free end of said handle portion;
    said dipper portion being generally triangular as seen in top plan, with said two opposite sidewalls converging from laterally opposite margins of said front wall to said handle portion;
    said bottom wall of said dipper portion being generally upwardly concave and including an upwardly opening, longitudinally elongated shallow trough which begins, gradually, midway between said sidewalls near said front wall and increases in depth until smoothly merging with said sluiceway there said dipper portion adjoins said handle portion;
    at least one of said upstanding walls of said dipper portion having opening means provided therethrough which extend down to adjacent said bottom wall, but insufficiently downwards to substantially drain said dipper portion when said dipper portion is being held to contain a minnow, but sufficiently to cause the minnow to lower into said shallow trough; said bottom wall and shallow trough thereof being imperforate;
    means providing an upstanding stop for said slot, at the free end of said handle portion; and
    drain opening means through said handle portion near said stop, so that when the minnow dipper is used to scoop-up a minnow from a pool of water, so long as the dipper is maintained with said trough lowermost where said dipper portion adjoins said handle portion, excess water will drain out of said opening means and lower the minnow, still in water, into said shallow groove, and so that as the minnow dipper is then tilted slightly to place the free end of the handle portion at least nearly as low as said trough where said dipper portion adjoins said handle portion, the minnow will reorient itself downstream and sluice with water contained in said dipper portion below said opening means down and sluiceway towards said upstanding stop, whereupon the water in the sluiceway will drain out of said drain opening means leaving the minnow aground in said sluiceway, oriented with its head away from said dipper portion;
    said handle portion being of sufficient depth that when minnows of sizes commonly used as bait become aground in said sluiceway and exposed through said slot, but closely flanked on both sides by said wall means throughout a substantial part of the height of the minnow.

2. The minnow dipper of claim 1, wherein:
    said upstanding front wall has an upper edge which is convexly bowed as seen in end elevation, and
    said upstanding sidewalls, for a distance of at least about 1¾ inch (4.8 cm) from laterally opposite ends of said upstanding front wall have upper edges which are shaped to conform against a generally cylindrical upstanding minnow bucket sidewall when the minnow dipper is dipped handle portion up, dipper portion down into a minnow bucket and the convexly bowed upper edge of the dipper portion brought into conformance with the minnow bucket sidewall.

3. The minnow dipper of claim 1, wherein:

said upstanding stop is constituted by an upstanding end wall provided at the free end of said handle portion.

4. The minnow dipper of claim 1, wherein:
said drain opening means is constituted by a plurality of perforations through said wall means of said handle portion.

5. The minnow dipper of claim 1, wherein:
said sluiceway extends at an included angle of 168-172 degrees to said shallow trough, so that when said minnow dipper is held so that said shallow trough is level, said sluiceway extends upwards from horizontal at an angle of 8-12 degrees.

6. The minnow dipper of claim 1, wherein:
said dipper portion upstanding sidewalls, as seen in plan, are outwardly convex from opposite margins of said upstanding front wall to adjacent said handle portion, whereas said upstanding sidewalls and bottom wall form a funnel-shaped transitional merger with said sluiceway of said handle portion.

* * * * *